(12) United States Patent
Yahagi

(10) Patent No.: US 7,146,797 B2
(45) Date of Patent: Dec. 12, 2006

(54) EXHAUST GAS PURIFICATION SYSTEM

(75) Inventor: Hideo Yahagi, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 29 days.

(21) Appl. No.: 10/963,643

(22) Filed: Oct. 14, 2004

(65) Prior Publication Data

US 2005/0081512 A1   Apr. 21, 2005

(30) Foreign Application Priority Data

Oct. 20, 2003   (JP) ............... 2003-359800

(51) Int. Cl.
*F01N 3/00*   (2006.01)
(52) U.S. Cl. ............ 60/275; 60/287; 60/292; 60/295; 60/311; 55/DIG. 30; 95/68; 95/69; 95/78; 95/79; 422/186.03; 422/186.04
(58) Field of Classification Search ............... 60/274, 60/275, 287, 291, 292, 295, 297, 311; 55/DIG. 30, 55/68, 69, 78, 79, 80; 422/186.03, 186.04, 422/186.1, 186.3; 95/68, 69, 78, 79, 80
See application file for complete search history.

(56) References Cited

U.S. PATENT DOCUMENTS

| | | | | |
|---|---|---|---|---|
| 4,923,484 A | * | 5/1990 | Saito | ............... 95/20 |
| 5,557,923 A | * | 9/1996 | Bolt et al. | ............... 60/274 |
| 5,715,677 A | * | 2/1998 | Wallman et al. | ............... 60/274 |
| 5,771,683 A | * | 6/1998 | Webb | ............... 60/274 |
| 5,900,043 A | * | 5/1999 | Grandjean et al. | ............... 95/29 |
| 6,843,054 B1 | * | 1/2005 | Taylor et al. | ............... 60/275 |

FOREIGN PATENT DOCUMENTS

| | | |
|---|---|---|
| DE | 37 11 312 A1 | 10/1988 |
| JP | A 2001-295629 | 10/2001 |
| JP | A 2002-021541 | 1/2002 |

* cited by examiner

*Primary Examiner*—Binh Q. Tran
(74) *Attorney, Agent, or Firm*—Oliff & Berridge, PLC

(57) ABSTRACT

An exhaust gas purification system including a catching reactor for attracting particulate matters in an exhaust gas from an engine by electrostatic force, a main exhaust path and an auxiliary exhaust path provided on the exit side of the catching reactor, a PM filter provided in the auxiliary exhaust path for filtrating and processing the exhaust gas, and a flow path control valve for selectively connecting the exit side of the catching reactor to the main exhaust path or the auxiliary exhaust path.

6 Claims, 3 Drawing Sheets

EXHAUST GAS PURIFICATION SYSTEM

This application claims priority from Japanese Patent Application No. 2003-359800 filed Oct. 20, 2003, which is incorporated hereinto by reference.

BACKGROUND OF THE INVENTION

1. Field of the Invention

The present invention relates to an exhaust gas purification system used in an internal combustion engine for purifying exhaust gas.

2. Description of the Related Art

As a technique for purifying exhaust gas discharged from an internal combustion engine, an exhaust gas purification system (a plasma reactor) has been conventionally proposed, using plasma generated by applying a high voltage to a pair of opposed electrodes. For example, Japanese Patent Application Laid-open No. 2001-295629 discloses a filtration type apparatus disposed in a flow path of the exhaust gas, which is formed by sandwiching a fibrous filter between a pair of metallic nets constituting an electrode. According to this apparatus, particulate matters (PM) in the exhaust gas caught by the fibrous filter is made to be radicals by energy of plasma generated by the application of high voltage between both the electrodes, wherein HC changes to $H_2O$ and $CO_2$ and a portion of PM burns to be incinerated. Such a filtration type apparatus has a drawback in that a pressure loss increases due to the exhaust resistance when the exhaust gas passes the filter.

On the other hand, as disclosed in Japanese Patent Application Laid-open No. 2002-21541, a straight-flow type or an electrostatic attraction type exhaust gas purification system is proposed, including a tubular outer circumferential electrode for catching particulate matters and a central electrode extending along an axis thereof, wherein plasma for cleaning the exhaust gas passing therethrough is generated by applying high voltage between both the electrodes. In this apparatus, PM in the supplied exhaust gas are charged due to the electric discharge from the central electrode, attracted to the outer circumferential electrode charged to have a polarity opposite thereto, and deposited thereon. The deposited PM are incinerated by heat and chemical reaction caused as high voltage is applied between both the electrodes. HC, CO and $NO_x$ in the exhaust gas react with oxygen in the exhaust gas to be harmless $N_2$, $CO_2$, $H_2O$ or others by energy of plasma formed between the central electrode and the outer circumferential electrode. In comparison with the above-mentioned filtration type apparatus, the electrostatic attraction type apparatus has an advantage in that a pressure loss due to the exhaust pressure decreases.

According to the electrostatic attraction type apparatus, however, there is a problem in that incompletely burnt PM are liable to generate as the deposit thereof increases and particularly, when an attracting honeycomb structure body is provided in the outer circumferential electrode, ash remaining after the combustion treatment causes the increase in pressure loss due to the reduction of a cell cross-section (opening area), resulting in the lowering of processing performance. A particle diameter of the attracted PM increases as the deposition progresses by the mutual bonding of the respective particulates via HC component, $H_2O$ component or others, whereby there is a risk in that PM may be peeled off from the attracting surface before it is processed by a high voltage and released downstream of the apparatus.

An object of the present invention is to provide means capable of restricting the discharge of non-treated PM so that the drawbacks in the conventional electrostatic type apparatus are minimized.

SUMMARY OF THE INVENTION

To achieve the object, the present invention provides an exhaust gas purification system, comprising first processing means for attracting particulate matters in an exhaust gas from an engine by electrostatic force, a main exhaust path and an auxiliary exhaust path provided on the exit side of said first processing means, second processing means provided in said auxiliary exhaust path for filtrating and processing the exhaust gas, and a flow path control valve for selectively connecting the exit side of said first processing means to said main exhaust path or said auxiliary exhaust path.

The inventive exhaust gas purification system preferably further includes control means for controlling said first processing means, said second processing means and said flow path control valve, wherein when a predetermined condition is satisfied, said control means operates to stop the attraction by said first processing means and selectively connect the exit side of said first processing means to said auxiliary exhaust path by the action of said flow path control valve.

It is preferable that the predetermined condition is that a rotational speed of said engine is lower than a predetermined value, or a flow rate of the exhaust gas is lower than a predetermined value, or a vehicle carrying said engine is in a phase of deceleration.

Further, it is preferable that said second processing means comprises a filter, and a plasma generator positioned on the upstream side of said filter.

The present invention further provides a method of purifying exhaust gas, comprising the steps of: operating said first processing means to stop the attraction, and selectively connecting the exit side of said first processing means to said auxiliary exhaust path by the action of said flow path control valve. In this regard, it is possible to perform either of operating step or connecting step prior to another, and also possible to start to perform both steps at the same time.

The above and other objects, effects, features and advantages of the present invention will become more apparent from the following description of embodiments thereof taken in conjunction with the accompanying drawings.

DETAILED DESCRIPTION OF PREFERRED EMBODIMENTS

An embodiment of the present invention will be described below with reference to the attached drawings. This embodiment of the exhaust gas purification system is suitably applicable to an automobile, incorporated into an exhaust passage of an engine (not shown) for cleaning exhaust gas discharged from a combustion chamber of the engine.

Figure 1:
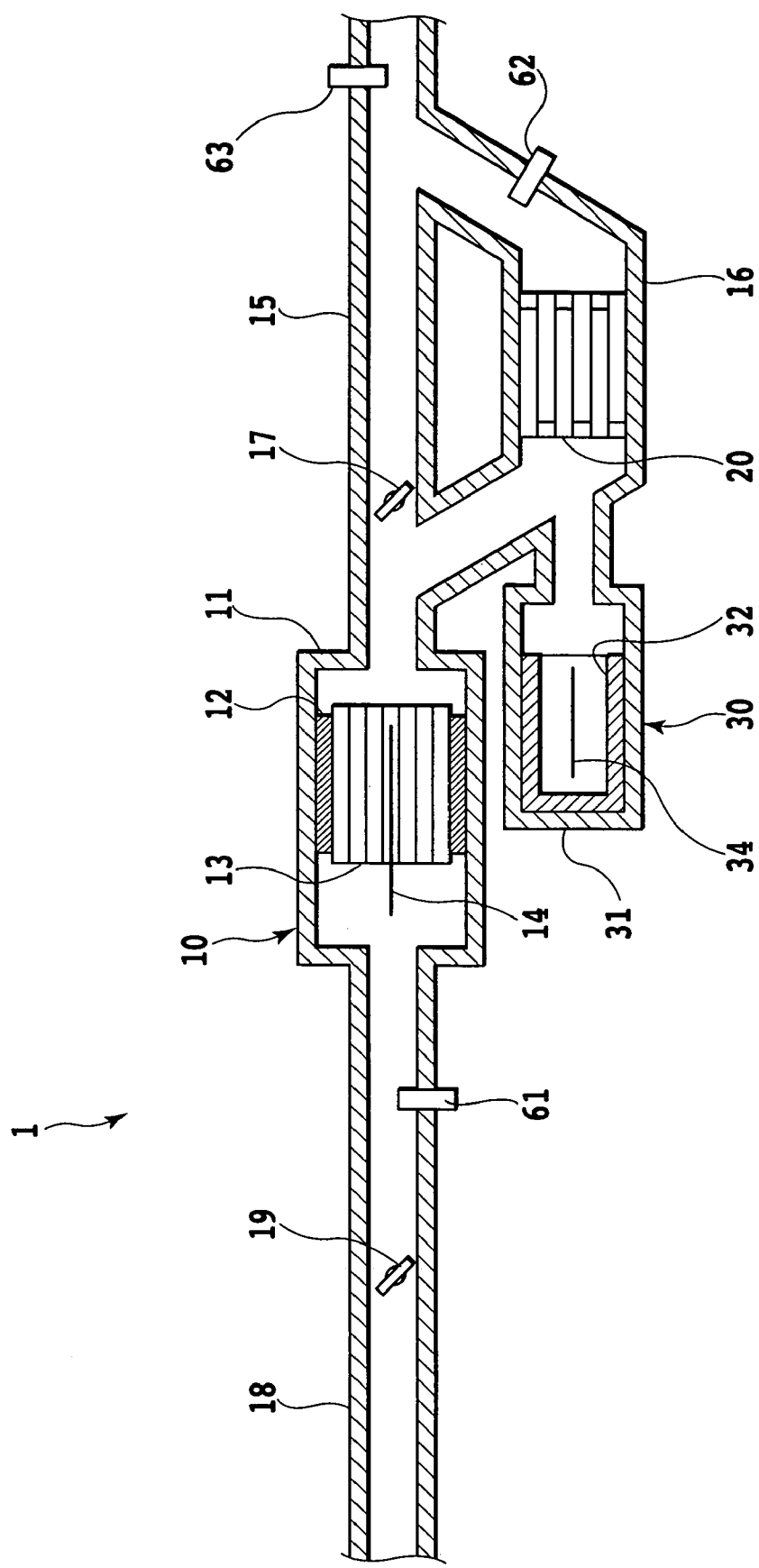
FIG. 1 is a sectional view schematically illustrating one embodiment of an exhaust gas purification system according to the present invention.

As shown in FIG. 1, the exhaust gas purification system 1 includes a catching reactor 10 formed as an electrostatic attraction type plasma reactor and a PM filter 20 formed as a filtration type filter. A auxiliary exhaust path 16 is connected in a branched manner to a midway point of a main exhaust path 15 provided on a exit side of the catching reactor 10, and a PM filter is provided at a midway point of the auxiliary exhaust path 15. A terminal end of the auxiliary exhaust path 16 joins to the main exhaust path 15.

The catching reactor 10 attracts and processes particulate matters in the exhaust gas discharged from the engine by the electrostatic force. The catching reactor 10 includes a generally cylindrical container 11, an outer circumferential electrode 12 of a generally cylindrical shape, disposed in the interior of the container 11, a generally cylindrically-shaped honeycomb structure body 13 disposed in the interior of the outer circumferential electrode 12, and a thin rod-shaped central electrode 14 inserted into the honeycomb structure body 13 to be arranged on the longitudinal axis of the outer circumferential electrode 12.

The outer circumferential electrode 12 and the central electrode 14 are suitably made of metallic material having sufficient electro-conductivity, heat durability and anti-corrosive property, such as stainless steel, and the outer circumferential electrode 12 may be formed of a plate, a foil, a wire net or a punched sheet thereof. An upstream portion of the central electrode 14 is exposed without being encircled with the outer circumferential electrode 12 so that PM in the exhaust gas are electrically charged in this area. In this regard, in the vicinity of the upstream end of the central electrode, branch-like projections may be provided for facilitating the electric discharge.

The honeycomb structure body 13 is a well-known honeycomb filter formed of porous sintered silicon carbide. In the honeycomb structure body 13, a number of cells having a generally square cross-section are regularly arranged in the axial direction, wherein the respective cells are sectioned from each other by a thin cellular wall. Front and rear ends of the respective cell are open so that the upstream side and the downstream side of the interior of the container are thereby communicated with each other. There is oxidation catalyst of metallic element and metallic oxide such as platinum group (for example, Pt), vanadium, copper, manganese or alumina on a surface of the cellular wall.

The PM filter 20 is mainly composed of a honeycomb filter formed of porous sintered silicon carbide wherein a number of cells having a generally square cross-section formed in the axial direction thereof are plugged up so that one of every pair of cells adjacent to each other is plugged up at a front end thereof and the other of the pair is plugged up at a rear end thereof. Thereby, the exhaust gas supplied from the front end side of the PM filter 20 enters the PM filter 20 from the cells opening at the front end thereof, passes through the cellular wall and is discharged downstream of the PM filter 20 through the cells adjacent to the former opening at the rear end thereof, during which the PM having a particle size larger than a pore diameter in the cellular wall are trapped by the PM filter 20.

In front of, and on the upstream side of, the PM filter 20, there is a plasma generator 30. The plasma generator 30 operates to radicalize the exhaust gas dwelling therein or in the vicinity of the PM filter 20 by the electrical discharge accompanied with the application of high voltage and generate $O_3$ and $NO_2$. The plasma generator 30 includes a generally cylindrical container 31, an outer circumferential electrode 32 of a generally cylindrical shape, disposed in the container 31, and a thin rod-shaped central electrode 34 disposed on the longitudinal axis of the outer circumferential electrode 32.

The outer circumferential electrode 32 and the central electrode 34 are suitably made of metallic material having sufficient electro-conductivity, heat durability and anti-corrosive property, such as stainless steel, and the outer circumferential electrode 32 may be formed of a plate, a foil, a wire net or a punched sheet thereof.

Upstream of the catching reactor 10, a front tube 18 is connected thereto, and a deceleration valve 19 is provided in the midway thereof for blocking the tube when the automobile is in a phase of deceleration, for example, during the engine-braking. In the vicinity of a branch point between the main exhaust path 15 and the auxiliary exhaust path 16, there is a flow path control valve 17 for opening or closing the main exhaust path 15. Each of the braking valve 19 and the flow path control valve 17 are a butterfly valve.

When the flow path control valve 17 blocks the main exhaust path 15, the exhaust gas discharged from the catching reactor 10 flows to the auxiliary exhaust path 16. On the other hand, when the flow path control valve 17 opens the main exhaust path 15, the exhaust gas flows into both of the main exhaust path 15 and the auxiliary exhaust path 16. In such a case, since the flow resistance of the PM filter 20 is large, the exhaust gas mainly flows into the main exhaust path 15.

Figure 2:
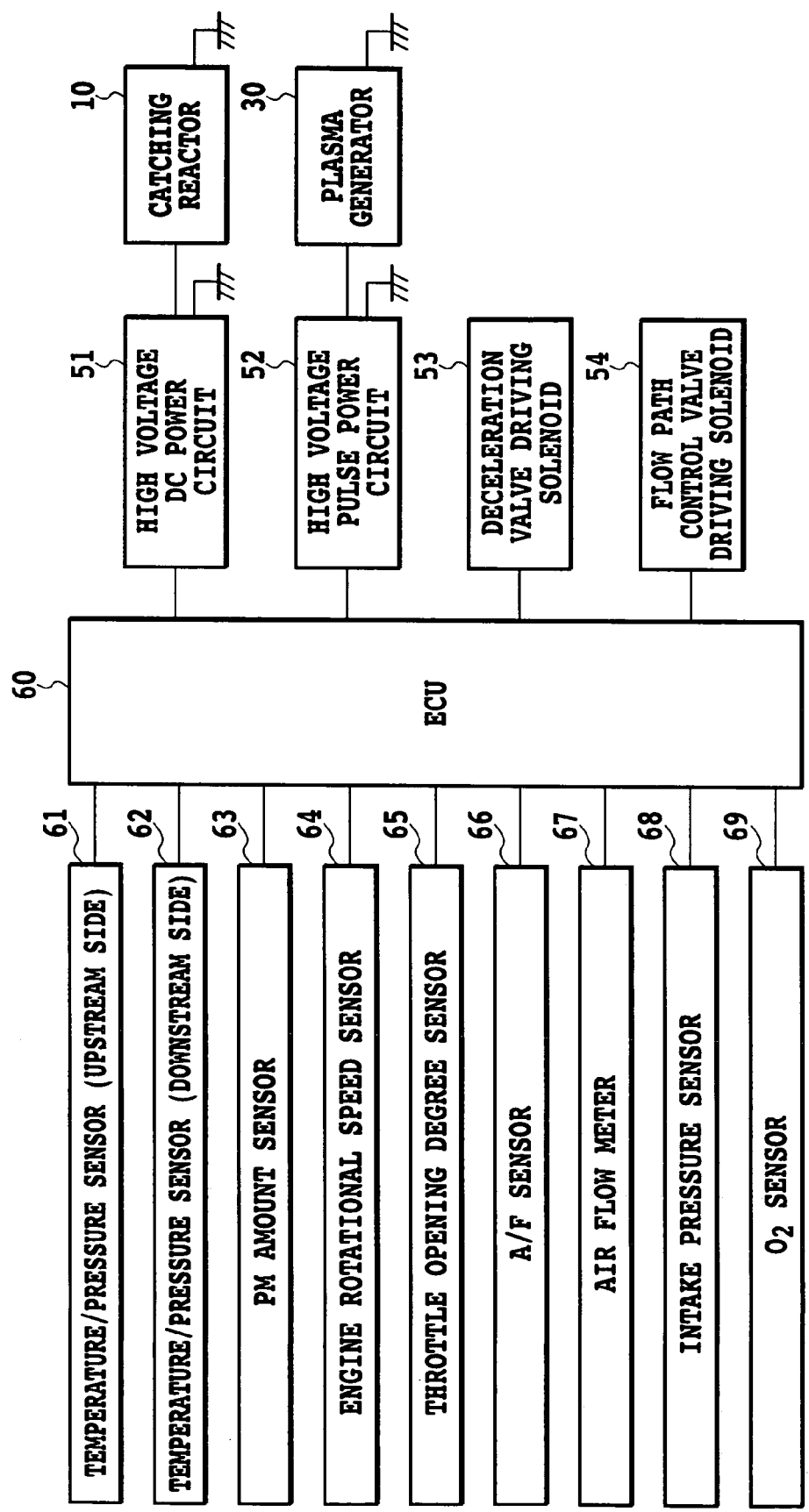
FIG. 2 is a block diagram illustrating an example of a control system for the exhaust gas purification system.

In FIG. 2, a high voltage DC power circuit 51 and a high voltage pulse power circuit 52 for applying a high voltage to the catching reactor 10 and the plasma generator 30 includes, respectively, an inverter circuit, a transformer, rectification diodes or others. To the high voltage DC power circuit 51 and the high voltage pulse power circuit 52, a DC source (not shown) for supplying a power thereto, such as a vehicle-mounted battery, is connected.

An electronic control unit (hereinafter referred to as ECU) 60 for controlling an overall system includes CPU, ROM, RAM, input and output ports, a non-volatile memory or others. Temperature/pressure sensors 61, 62 disposed on the upstream side of the catching reactor 10 and the downstream side of the PM filter 20, respectively, and a PM amount sensor 63 disposed in the main exhaust path 15 downstream of the meeting point between the paths 15 and 16 are connected to the input port of ECU 60. Also, an engine rotation sensor 64, a throttle opening degree sensor 65, an A/F (air/fuel ratio) sensor 66, an air flow meter 67 provided on the intake side, an intake pressure sensor 68 provided in an intake manifold, an $O_2$ sensor 69 provided in an exhaust manifold, or others are connected to the input port of ECU 60. In ECU 60, values representing the condition of the internal combustion engine are computed based on detection signals issued from these sensors and processed as described later.

In addition to the above-mentioned high voltage DC power circuit 51 and the high voltage pulse power circuit 52, a brake valve driving solenoid 53 and a flow path control valve driving solenoid 54 are connected to the output port of ECU 60.

Various functions and reference values described later are stored in ROM of ECU 60 in advance, together with control programs. ECU 60 operates in accordance with the predetermined control programs and calculates a flow rate of the exhaust gas based on values detected by the various sensors. Based on this flow rate of the exhaust gas, ECU 60 calculates and issues a driving pulse signal (a gate signal) for driving an inverter circuit of the high voltage DC power circuit 51 and the high voltage pulse power circuit 52, a voltage indication signal or others. In the power circuits 51 and 52, a direct voltage from the DC source is converted to an alternate voltage by the inverter, rectified by the diodes while being stepped up by the transformer. The output voltage is applied to the catching reactor 10 and the plasma generator 30.

Figure 3:
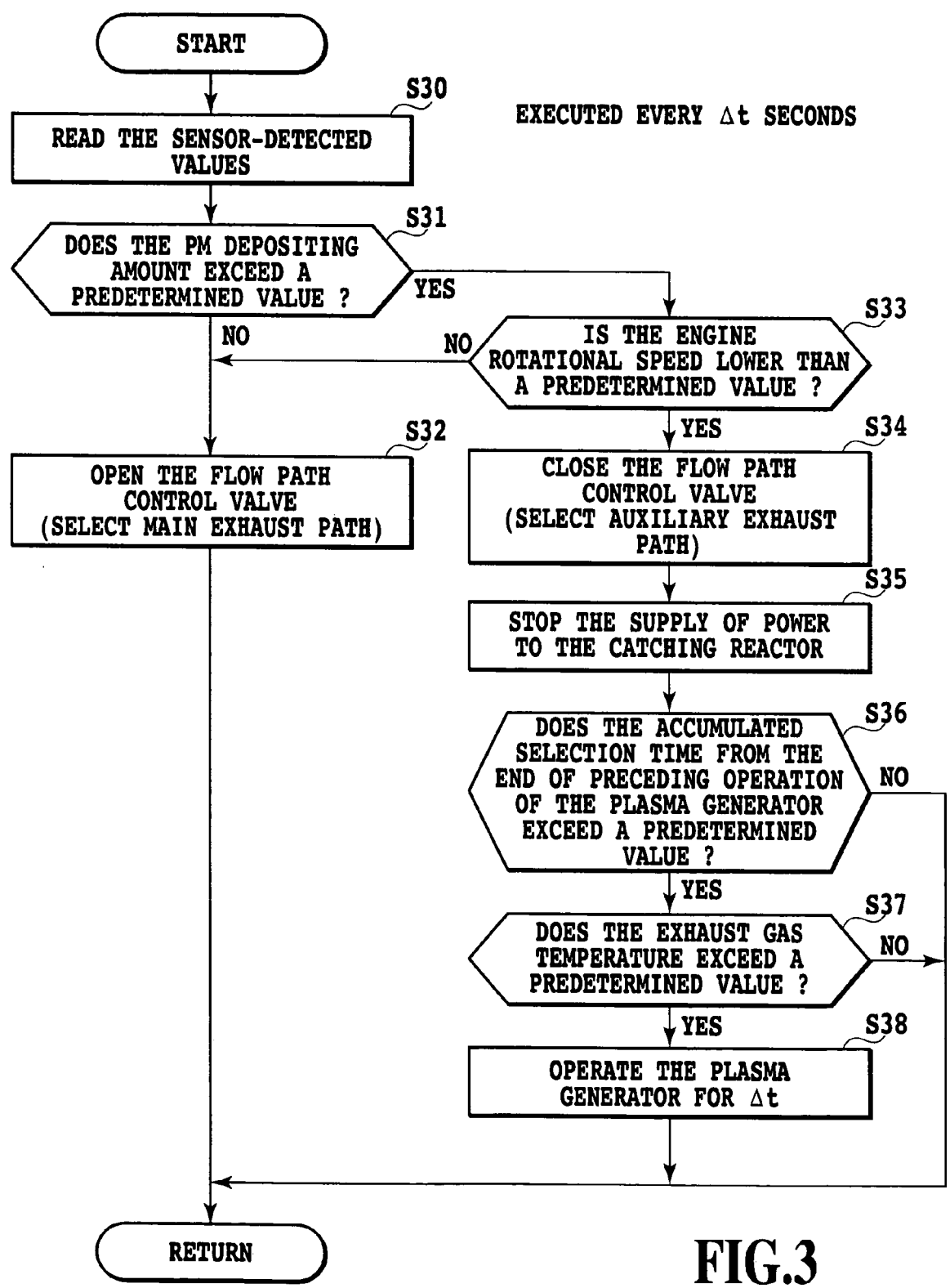
FIG. 3 is a flow chart illustrating a process according to the present invention.

The operation of this embodiment thus structured will be described below. A processing routine shown in a flow chart of FIG. 3 is repeatedly executed at a constant time interval $\Delta t$ in ECU 60. First, after initializing the memory, values detected by the respective sensors (that is, the temperature and pressure of the exhaust gas from the temperature/pressure sensors 61, 62; the flow rate of PM from the PM amount sensor 63; the engine rotational speed from the engine rotation sensor 64, the throttle opening degree from the throttle opening degree sensor 65, the air/fuel ratio from the A/F sensor 66, the flow rate of exhaust gas from the air flow meter 67, the intake pressure from the intake pressure sensor 68 and the oxygen concentration from the $O_2$ sensor 69) are loaded (S30).

Then, a PM deposition amount in the catching reactor 10 is calculated based on the difference in exhaust gas pressure between the temperature/pressure sensors 61, 62, and compared with a predetermined reference value (S31). Also, the rotational speed of the engine is compared with a predetermined reference value (S33). If the PM deposition amount is less than the reference value and/or the engine rotational speed is higher than the reference value, the flow path control valve 17 is made open (S32) to select the main exhaust path 15.

If the PM deposition amount is more than the reference value and the engine rotational speed is lower than the reference value, the flow path control valve 17 is closed (S34) to select the auxiliary exhaust path 16. Also, the power supply to the catching reactor 10 is OFF (S35), whereby the attraction of PM in the catching reactor 10 is made to stop and PM adhered to the honeycomb structure body 13 of the catching reactor 10 by this point of time are conveyed downstream by the exhaust gas stream and released. The released PM flow via the auxiliary exhaust path 16 and are filtrated by the PM filter 20 and deposited thereon.

Next, an accumulated selection time from the completion of the preceding operation of the plasma generator 30 is compared with a predetermined reference value (S36). The accumulated selection time is defined as an accumulated value of time period in which the auxiliary exhaust path 16 is selected by the flow path control valve 17. This time is measured in advance by a software timer and stored in a non-volatile memory of ECU 60. Also, the exhaust gas temperature detected by the temperature/pressure sensor 61 is compared with a predetermined reference value (S37). If the accumulated selection time is larger than the predetermined reference value and the exhaust gas temperature is higher than the predetermined value, the high voltage pulse power circuit 52 is driven to operate the plasma generator 30 for a predetermined time interval $\Delta t$ (S38). By the operation of the plasma generator 30, the exhaust gas is in the radical state due to the plasma energy, in which HC changes to $H_2O$ and $CO_2$ and C changes to $CO_2$ as well as part of PM burn to be incinerated.

As described above, according to this embodiment, since the exit side of the electrostatic attraction type catching reactor 10 is selectively connected either to the main exhaust path 15 or the auxiliary exhaust path 16, it is possible to filtrate the exhaust gas and prevent the non-treated PM from being released outside by selecting the auxiliary exhaust path 16 and using the filtration type PM filter 20.

According to this embodiment, the attraction of PM by the catching reactor 10 is made to stop, and the exit side of the catching filter 10 is connected to the auxiliary exhaust path 16 by the flow path control valve 17 when the predetermined condition is satisfied, all by the control of ECU 60, thereby it is made possible to strip PM off from the electrostatic attraction type catching reactor 10, thus regenerating the catching reactor 10 and restricting the discharge of PM.

While the pressure loss due to the PM filter 20 increases as the flow rate of the exhaust gas becomes larger in the filtration type PM filter 20, it is possible to minimize the influence of the pressure loss caused by the PM filter 20 according to this embodiment, since the regeneration of the catching reactor 10 is carried out when the engine rotational speed is less than the predetermined value.

In this regard, according to the above embodiment, while the catching reactor 10 is regenerated under the condition in that the rotational speed of the engine is lower than the predetermined value, it is also possible to adopt any physical amount other than the engine rotational speed, for indicating the vehicle condition. For example, the catching reactor 10 may be regenerated when the flow rate of the exhaust gas is less than the predetermined value. In this case, the flow rate of the exhaust gas may be obtained not only directly from the air flow meter 67 but also based on the intake pressure in the intake manifold of the engine detected by the intake pressure sensor 68.

Also, the regeneration of the catching reactor 10 may be carried out when the engine is in a phase of deceleration. In such a case, by combining the regenerating operation with the control for closing the deceleration valve 19 accompanied with the decelerating operation carried out by the driver such as an OFF-motion of the accelerating pedal (the engine braking) and/or an ON-motion of the brake pedal. Thus, it is possible to further minimize the pressure loss caused by the use of the PM filter 20.

Also, in the above embodiment, while the difference in exhaust gas pressure between before and after the catching reactor 10 or the accumulated selection time of the PM filter 20 is used as a parameter for estimating the deposition amount of PM in the catching reactor 10 or the PM filter 20, other parameters may be optionally usable for the estimation of PM, such as the air/fuel ratio detected by the A/F sensor 66 or the integration thereof.

Also, while a high voltage DC is applied to the catching reactor 10 and a pulse voltage is applied to the plasma generator 30 in the above-mentioned embodiment, optional wave forms of the voltage to be applied to both the means may be employed for the purpose of obtaining the desired effects of the present invention.

Also, while steps S34 and S35 are performed essentially simultaneously in the above embodiment, it is possible in the present invention to perform either of operating step or connecting step prior to another.

In addition, the first processing means can take forms other than the above-explained combination of a cylindrical electrode and a bar-like electrode; for example, an outer circumferential electrode can have a polygonal cross section, a combination of a plurality of cylindrical electrodes and a plurality of bar-like electrodes can be hired, and a combination of a plurality of separate planer electrodes opposing to each other can be hired. Also, the second processing means can take any other form, such as a pair of metallic nets or breathable electrodes sandwiching a fibrous filter.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An exhaust gas purification system comprising:
   first processing means for attracting particulate matters in an exhaust gas from an engine by electrostatic force,
   a main exhaust path and an auxiliary exhaust path provided on the exit side of said first processing means,
   second processing means provided in said auxiliary exhaust path for filtrating and processing the exhaust gas,
   a flow path control valve for selectively connecting the exit side of said first processing means to said main exhaust path or said auxiliary exhaust path, and
   control means for controlling said first processing means, said second processing means and said flow path control valve, wherein
   when a predetermined condition is satisfied, said control means operates to stop the attraction by said first processing means and selectively connect the exit side of said first processing means to said auxiliary exhaust path by the action of said flow path control valve.

2. An exhaust gas purification system as defined by claim 1, where said predetermined condition is that a rotational speed of said engine is lower than a predetermined value.

3. An exhaust gas purification system as defined by claim 1, where said predetermined condition is that a flow rate of the exhaust gas is lower than a predetermined value.

4. An exhaust gas purification system as defined by claim 1, where in said predetermined condition is that a vehicle carrying said engine is in a phase of deceleration.

5. An exhaust gas purification system as defined by claim 1, wherein said second processing means comprises:
   a filter, and
   a plasma generator positioned on the upstream side of said filter.

6. A method of purifying exhaust gas using an exhaust gas purification system defined by claim 1, comprising the steps of:
   operating said first processing means to stop the attraction, and
   selectively connecting the exit side of said first processing means to said auxiliary exhaust path by the action of said flow path control valve.

* * * * *